United States Patent
Lupini et al.

(10) Patent No.: US 8,037,472 B2
(45) Date of Patent: Oct. 11, 2011

(54) BUILDING AND INSTALLING DYNAMIC INSTALLATION PACKAGES USING A DECLARATIVE AUTHORING TOOL

(75) Inventors: Francesco Lupini, Rome (IT); Luigi Pichetti, Rome (IT); Antonio Secomandi, Milan (IT)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 12/367,578

(22) Filed: Feb. 9, 2009

(65) Prior Publication Data

US 2009/0150881 A1    Jun. 11, 2009

Related U.S. Application Data

(63) Continuation of application No. 10/835,499, filed on Apr. 29, 2004, now Pat. No. 7,503,043.

(30) Foreign Application Priority Data

Sep. 5, 2003 (FR) .................................... 03 368085

(51) Int. Cl.
*G06F 9/445* (2006.01)
(52) U.S. Cl. .......................... 717/175; 717/176; 717/177
(58) Field of Classification Search .......................... None
See application file for complete search history.

(56) References Cited

U.S. PATENT DOCUMENTS

| | | | |
|---|---|---|---|
| 5,974,454 A | 10/1999 | Apfel et al. |
| 6,262,726 B1 | 7/2001 | Stedman et al. |
| 6,347,397 B1 | 2/2002 | Curtis |
| 7,028,019 B2 | 4/2006 | McMillan et al. |
| 7,032,220 B2 | 4/2006 | Curtis |
| 7,073,172 B2 | 7/2006 | Chamberlain |

OTHER PUBLICATIONS

Muller, Nathan J., "Focus On Open View", A Guide to Hewlett-Packard's Network and Systems Management Platform, Chapters 8 and 9, Mar. 1995, 73 pages.

*Primary Examiner* — Jason Mitchell
(74) *Attorney, Agent, or Firm* — Francis Lammes; Stephen J. Walder, Jr.; Jill A. Poimboeuf

(57) ABSTRACT

Building a package for installing a software application on a data processing system with a distributed architecture is provided. The installation package is built using an authoring tool based on a declarative model. A descriptor is used to define a desired configuration of the system. The installation package is built declaring a discoverer element, a producer element and a consumer element into the wizard tree. During the installation process, the discoverer element detects a current configuration of the system. The producer creates a working queue dynamically, inserting the installation operations that are needed for reaching the desired configuration from the current configuration of the system. The producer then executes the installation operations defined in the working queue. In this way, the installation operations are determined at runtime.

20 Claims, 7 Drawing Sheets

BUILDING AND INSTALLING DYNAMIC INSTALLATION PACKAGES USING A DECLARATIVE AUTHORING TOOL

This application is a continuation of application Ser. No. 10/835,499, filed Apr. 29, 2004, status awaiting publication.

TECHNICAL FIELD

The present invention relates to the data processing field, and more specifically to a method of installing a software application on a data processing system.

BACKGROUND ART

The installation of software applications plays a key role in the management of data processing systems. For example, this is a very time consuming activity in large organizations embracing thousands of computer, wherein the configuration of the computers is periodically updated in order to be abreast of the information technology development or to comply with organizational changes; typically, the update of the configuration of each computer involves installing and disinstalling software products or upgrading the software products already available to new versions thereof. In the following, the activities relating to the installation, the disinstallation or the upgrade of the software products will be generically denoted as installation process; however, it should be understood that the term installation as used hereinafter refers to any activities causing the addition or the removal of software features (unless otherwise specified).

The installation of each software product requires the building of a corresponding package. Several installation authoring tools have been proposed in the last years to assist a software developer to create professional looking, reliable and flexible installation packages. All the authoring tools known in the art (such as "InstallShield", described in Learning Multi-Platform Edition Training Manual, Robert M. Dickau-TRNMPLM01-1602) are based on a declarative model. In other words, the developer is required to declare any installation element to be embedded into the package (for use during the installation process). For example, a product tree is used to declare the functions implementing the installation of each feature of the software product; a wizard tree is used to declare a sequence of panels for controlling the interaction with an end-user during the installation process.

A drawback of the authoring tools known in the art is that those elements must be declared explicitly when the installation package is built. Therefore, the operations supported by the installation package (and that can be performed during the installation process) are defined statically and cannot be changed at run-time.

The definition of the installation package (even for a quite simple software product) then requires a high number of elements for each possible combination of installation operations; as a consequence, the installation package becomes very complex, cumbersome and difficult to maintain.

In any case, the proposed authoring tools cannot be used in dynamic environments; indeed, in these environments it is not possible to make any assumptions (when the installation packages are built) about the structure of the data processing systems wherein the software products will be installed. This problem is particularly acute when the data processing systems have a distributed architecture, because their actual topology is discovered only at run-time.

An additional limitation of the authoring tools known in the art is that the whole installation process is typically aborted in response to the failure of a single installation operation. This behavior is unacceptable when dealing with the installation of complex software applications, which require the execution of a high number of installation operations on different computers.

SUMMARY OF THE INVENTION

It is an object of the present invention to provide a method of installing a software application (using a package that has being built with a tool based on a declarative model), wherein the installation operations are determined dynamically at runtime (during the installation process).

It is another object of the present invention to simplify the definition of the installation package and to facilitate its maintenance.

It is yet another object of the present invention to support the use of the installation package in dynamic environments (wherein no assumptions can be made, when the installation package is built, about the structure of the data processing systems wherein the software application will be installed).

The accomplishment of these and other related objects is achieved by a method of installing a software application on a data processing system according to installation elements being previously declared, the method including the steps of: a discoverer element detecting a current configuration of the system, a producer element creating a working structure dynamically, the working structure including an indication of installation operations for reaching a target configuring defined in a specification element from the current configuration, and a consumer element executing the installation operations indicated in the working structure.

The present invention also provides a computer program for performing the method and a program product storing the program; a corresponding apparatus for installing the software application is also encompassed.

In addition, the present invention provides a method of building a package for installing a software application, the package built using the method, and an installation product storing the package. A corresponding apparatus for building the package is also encompassed.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT(S)

Figure 1A:
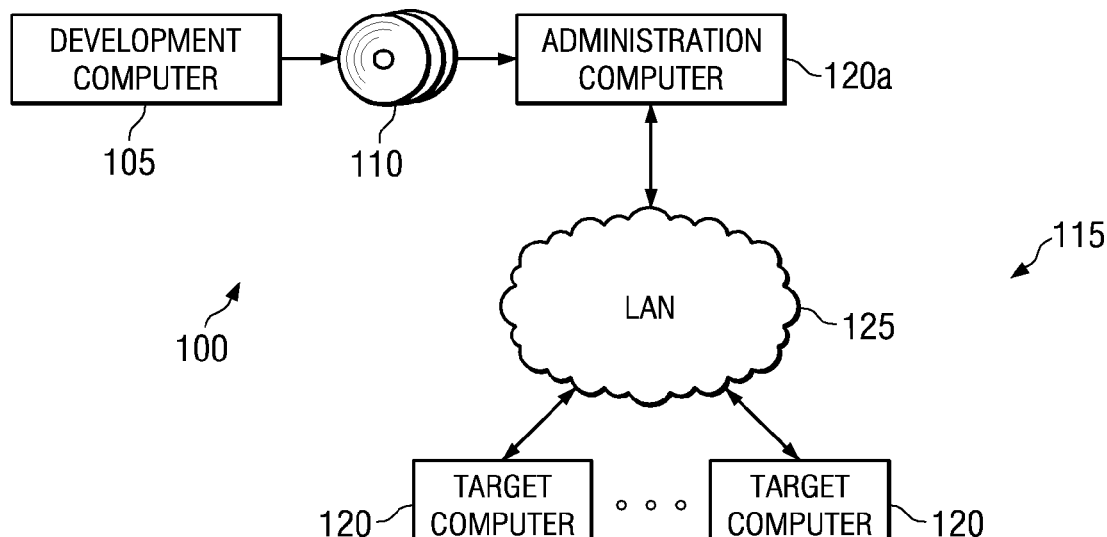
FIG. 1a is a schematic block diagram of a data processing environment in which the method of the invention is applicable.

With reference in particular to FIG. 1a, a data processing environment 100 wherein the invention can be practiced is shown. The data processing environment 100 includes a development computer 105, which is used to build packages (or release images) for installing software products. The installation packages are duplicated on CD-ROMs 110; the CD-ROMs 110 are then transmitted to different data processing systems 115 (only one shown in the figure).

The data processing system 115 has a distributed architecture, wherein multiple target computers 120 communicate through a network 125 (for example, a LAN). One of the target computer (differentiated by adding the suffix "a", that is 120a) operates as an administration computer. The administration computer 120a directly receives the CD-ROMs 110 (from the development computer 105); the installation package stored on the CD-ROMs 110 is then run, in order to install the corresponding software products (or portions thereof) on selected target computers 120.

Figure 1B:
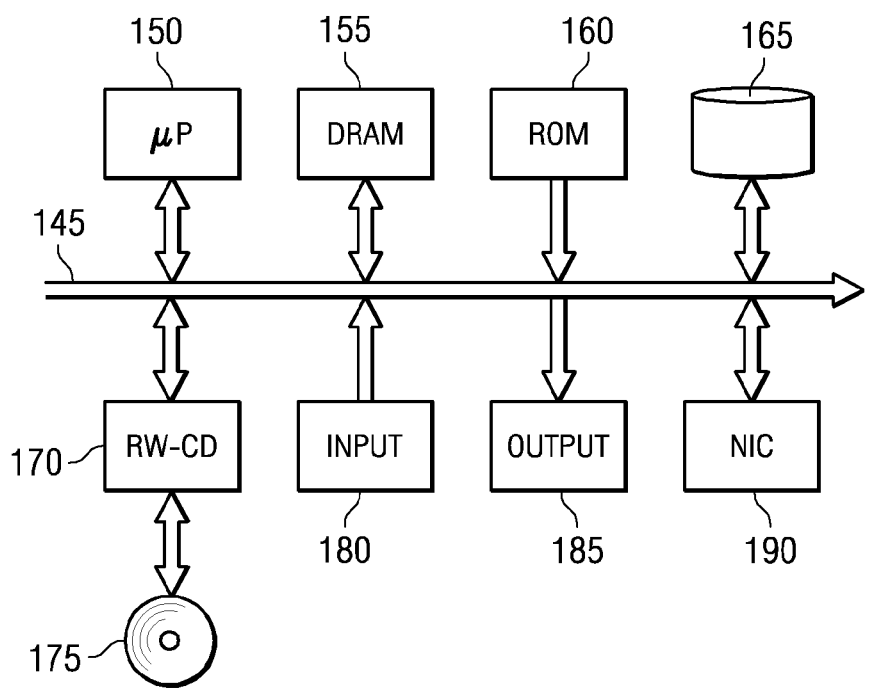
FIG. 1b shows the functional blocks of a generic computer of the data processing environment.

As shown in FIG. 1b, a generic computer of the above-described data processing environment (development computer, administration computer or target computer) is formed by several units that are connected in parallel to a communication bus 145. In detail, one or more microprocessors (μP) 150 control operation of the computer, a DRAM 155 is directly used as a working memory by the microprocessor(s) 150, and a ROM 160 stores basic code for a bootstrap of the computer. Several peripheral units are further connected to the bus 145 (by means of respective interfaces). Particularly, a mass memory consists of a magnetic hard-disk 165 and a driver 170 for reading and writing CD-ROMs 175. Moreover, the computer includes input devices 180 (for example, a keyboard and a mouse), and output devices 185 (for example, a monitor and a printer). A network Interface Card (NIC) 190 is used to plug the computer into the data processing environment.

Similar considerations apply if the method is used in an equivalent data processing environment, if the software products are installed on different data processing systems (for example, Internet-based), and if the computers have another architecture or include equivalent units. Moreover, the concepts of the present invention are also applicable when the installation packages are distributed on other computer readable medium (such as floppy-disks).

The method of the present invention applies to standard installation authoring tools, which are based on a declarative model (such as "InstallShield"). The authoring tool provides a graphical interface that helps a user to create the installation package. For each software product to be deployed, the user defines a project; the project is structured as a collection of basic elements implemented with Java Beans. The Beans are reusable software components that comply with a pre-set specification, consisting of a series of common rules and principles that define standard naming conventions and type signatures.

The Beans are organized into trees. Particularly, a product tree includes corresponding Beans describing a layout of the software product. The product tree is structured in a hierarchy with three levels. The software product defines a root of the product tree. The software product contains one or more features, which are the smallest elements that are visible during an installation process of the software product. Each feature consists of one or more components (being not visible during the installation process); the components directly contain the data to be used and define the operations to be performed during the installation process. For example, the components specify files to be added or removed, instructions for creating desktop icons, modifying environment variables, writing or deleting information in text files, running specific command lines, and the like.

The user can control whether each product Bean is active during the installation process by attaching one or more conditions (such as platform-based conditions). Moreover, the user specifies different properties for the product Bean; for example, it is possible to define a default condition of the product Bean (active or inactive), a target location for the installation, the desired behavior when information must be replaced or removed, other components or features required by the product Bean, and the like. Furthermore, the product Beans for the components include additional properties for specifying the desired behavior when their installation fails (for example, continue, exit or rollback) and a corresponding summary message to be logged.

The authoring tool also supports a wizard tree including corresponding Beans, which are used to implement Graphical User Interface (GUI) utilities for helping install the software product. The wizard Beans are placed under a root of the tree, and specify the ordering of panels to be displayed or actions to be performed during the installation process. For example, the authoring tool supports wizard Beans providing a number of commonplace panels (implementing welcome, destination, setup type, features, preview, license approval, password, and summary functions). On the other hand, the wizard Beans for the actions make it possible to specify the installation or the disinstallation of the software product, the setting of product Bean properties, the jumping to a specified wizard Bean, the embedding of specific files into the installation package, and the like. The wizard Beans can also be collected into sequences; a sequence contains other wizard Beans, which are conditionally executed or skipped as a whole.

The user can control whether each wizard Bean is active during the installation process by attaching one or more conditions (similar to the ones of the product Beans). In addition, the user specifies different properties for the wizard Bean; for example, it is possible to define the format of the corresponding panel, a text to be displayed, the navigation buttons available (for example, back, next and cancel), and the like.

Once the product tree and the wizard tree of the project have been defined, the user can build a corresponding installation package. The authoring tool allows specifying different properties of the installation package. For example, it is possible to define the type of archive to be built (such as a collection of CD-ROMs), one or more setup launchers for running the installation package on different software platforms, whether the installation package will be distributed as a single self-extracting archive (embedded in the setup launcher), and the like. Typically, the authoring tool also supports an automated build process that can be invoked from a command line or a script.

The installation package is duplicated and distributed to the desired computers. An end-user receiving the installation package runs the corresponding setup launcher. In response thereto, the panels are shown to the end-user in the order specified in the wizard tree, and the actions defined in the wizard tree are executed. Typically, the wizard tree includes a Bean triggering the installation of the software product; as a consequence, the operations defined by the (active) Beans included in the product tree are performed. If any error occurs during the installation process, the setup launcher creates a log file and displays a corresponding panel. The installation package can also be invoked in a console mode (for computers that do not have any graphical interface) or in a silent mode (without displaying any panel, and using default values and values read from a response file for the properties to be entered by the end-user).

In a typical scenario according to the prior art, the authoring tool is used for installing a simple software product on a single computer. In this case, all the features of the software product (each one consisting of one or more components) are defined in the product tree; the sequence of panels and actions for installing the software product is defined in the wizard tree. When the end-user runs the corresponding installation package, he/she is provided with a series of panels (typically, for choosing the destination of the software product and the features to be added or removed). For each feature to be installed, the corresponding product Beans are enabled (setting their properties to active); conversely, the other product Beans are disabled. When the wizard Bean triggering the installation of the software product is reached, the operations corresponding to the choices of the end-user are executed calling all the active Beans defined in the product tree.

Figure 2:
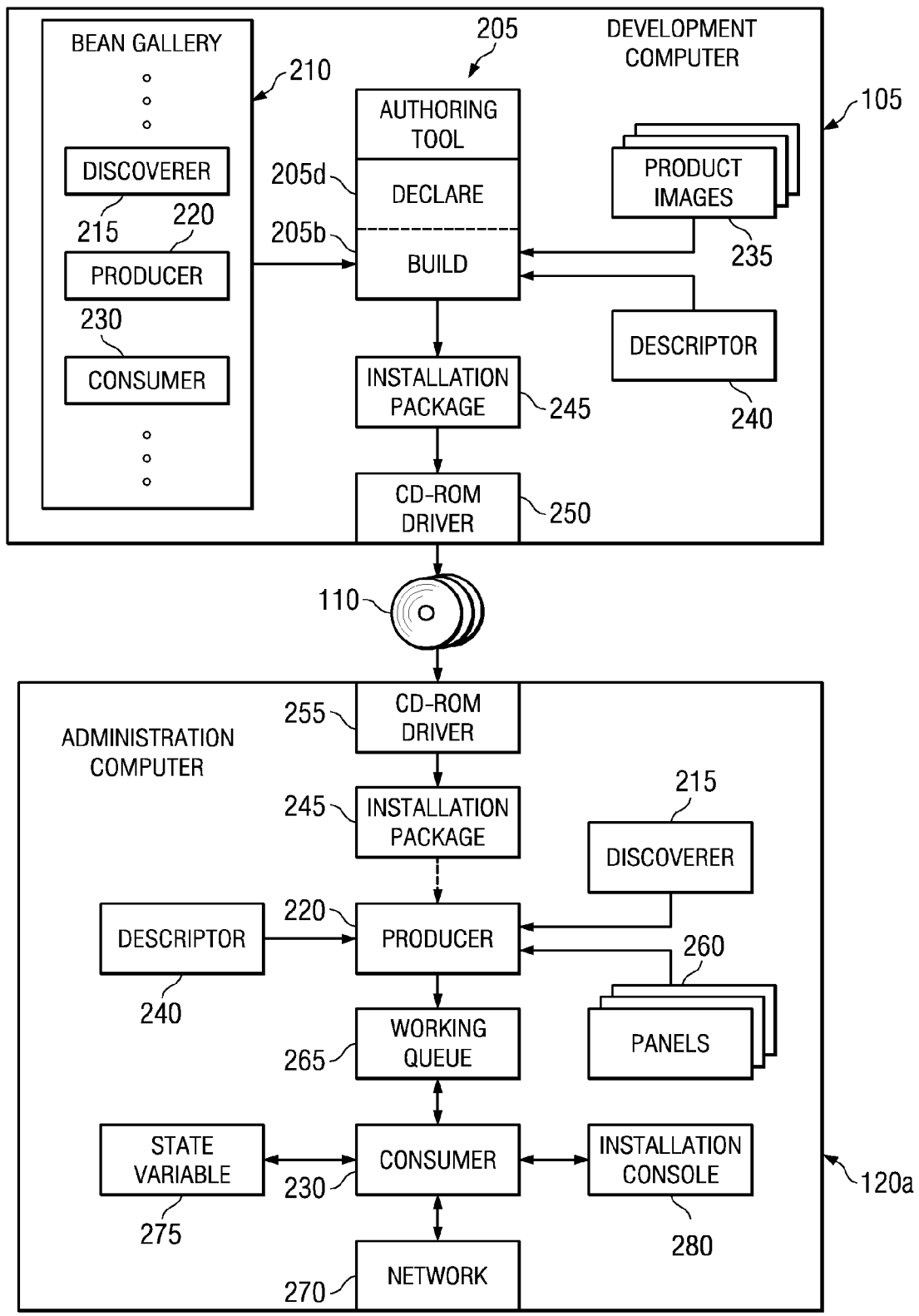
FIG. 2 depicts the main software components used for implementing the method.

Conversely, in the method of the invention the same authoring tool is used to build installation packages that exhibit a dynamic behavior. The main software components that can be used to implement the proposed method are depicted in FIG. 2. The information (programs and data) is typically stored on the hard-disks and loaded (at least partially) into the working memories when the programs are running, together with an operating system and other application programs (not shown in the figure). The programs are initially installed onto the hard disks from CD-ROM.

A developer working on the computer 105 uses a standard authoring tool 205 (as described above); the authoring tool 205 includes a section 205d for declaring the product tree and the wizard tree, and a section 205b for building the installation package according to the content of the product and wizard trees. All the Beans that are available to the authoring tool 205 (i.e., standard Beans shipped with the authoring tool 205 and custom Beans defined by the developer) are registered with a gallery 210. Particularly, the Bean gallery 210 includes a custom Bean 215 acting as a discoverer, a custom Bean 220 acting as a producer, and a custom Bean 230 acting as a consumer. The authoring tool 205 accesses a repository storing installation images 235 for different software products; the product images 235 include all the files required during the installation of the corresponding software products. Each solution to be deployed using the authoring tool 205 (for example, consisting of a complex distributed software application based on multiple products) is defined in a descriptor 240.

The authoring tool 205 builds a package 245 for the installation of the software application. The installation package 245 is provided to a CD-ROM driver 250, which controls the recording of the installation package 245 on the CD-ROMs 110. The CD-ROMs 110 are distributed to the administration computer 120a. A CD-ROM driver 255 running on the administration computer 120a reads the installation package 245 from the CD-ROMs 110. An administrator working on the computer 120a runs the setup launcher associated with the installation package 245.

The corresponding installation process involves the loading of different software components. In detail, the discoverer 215 detects a current configuration of the data processing system managed by the administration computer 120a. The current configuration includes information about a topology of the data processing system (identifying the target computers and their arrangement); for each target computer, the current configuration also specifies all the products that are already installed. Moreover, the discoverer 215 identifies one or more roles that are played by each target computer; the roles can be either architectural roles that have been assigned to the target computers during their configuration (for example, a database server) or logic roles that are inferred from the installed products (for example, a depot in a software distribution application).

The current configuration of the system is provided to the producer 220. Additional information is input to the producer 220 by the administrator directly using a series of panels 260. The producer 220 also accesses the descriptor 240 of the software application to be installed. For each role, the descriptor 240 specifies a desired configuration of the target computers playing that role and the operations required to reach the desired configuration.

Accordingly, the producer 220 creates a working queue 265, which specifies the operations to be performed for installing the software application. The consumer 230 in succession executes the installation operations specified in the working queue 265; for this purpose, the consumer 230 interfaces with a network module 270 (controlling the communications with the other target computers). The consumer 230 also owns a (persistent) state variable 275, which stores an indication of the progress of the installation process. In addition, the consumer 230 loads a console 280 that is used to control the installation process interactively (for example, resuming the installation process after an error, repeating any failed installation operations, holding the execution of selected installation operations, and the like).

Similar considerations apply if the programs and the corresponding data are structured in another way, if different functions are supported, or if the programs are provided on equivalent computer readable medium (such as floppy-disks). Moreover, the concepts of the present invention are also applicable when the installation packages have a different structure or are defined in another way, when two distinct wizard trees are provided (one for the installation and another for the disinstallation of the software application), or when different installation elements are declared in the product and wizard trees. Alternatively, the roles are specified in another way, the product tree and the wizard tree are replaced with an equivalent definition structure and an equivalent execution structure, respectively, or the installation packages are built using different authoring tools (for example, "InstallAnywhere", "Wise Installation System" or "Setup Builder").

Figure 3A:
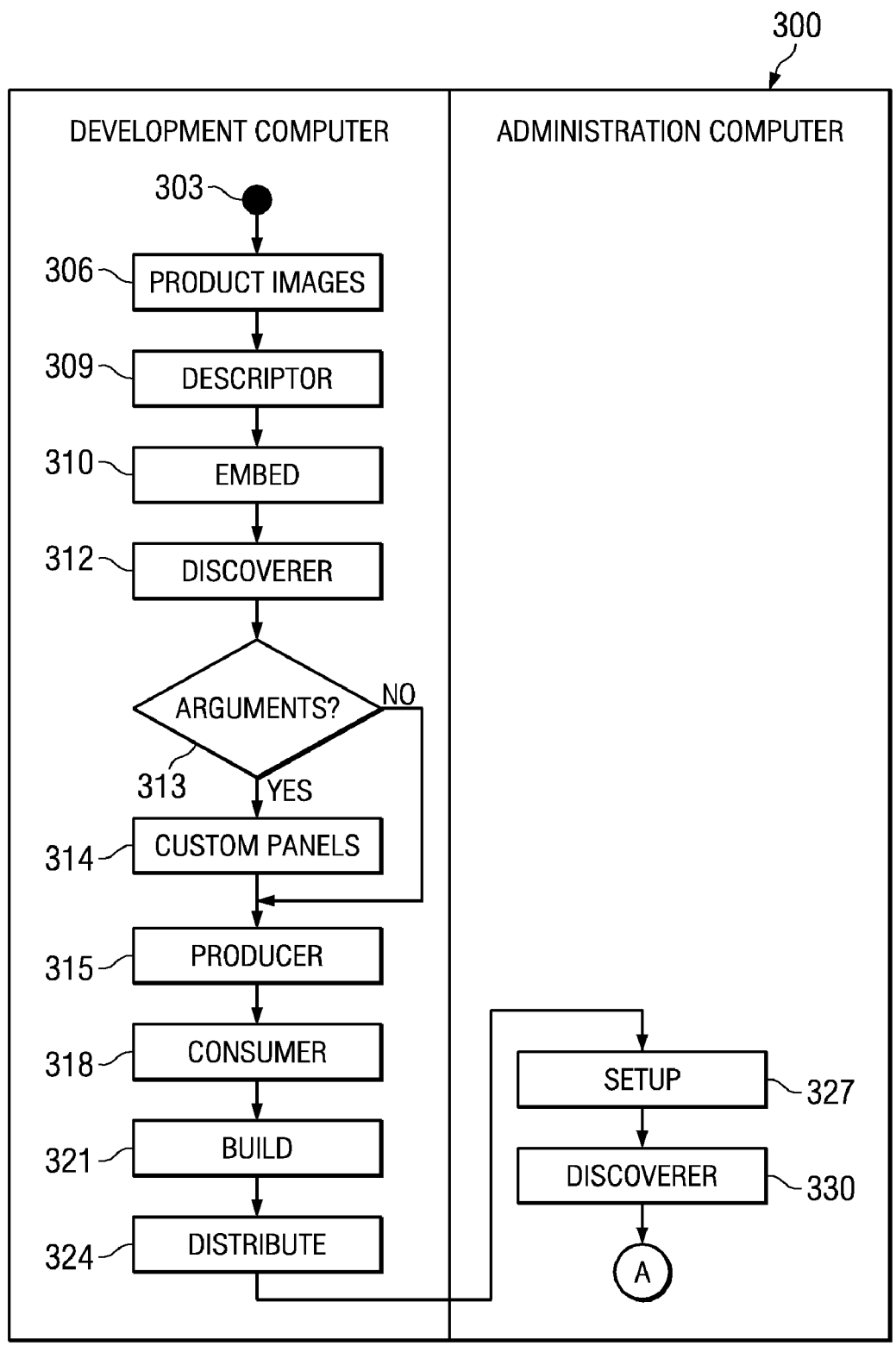
FIGS. 3a-3c show a diagram describing the flow of activities relating to an installation process.
Figure 3B:
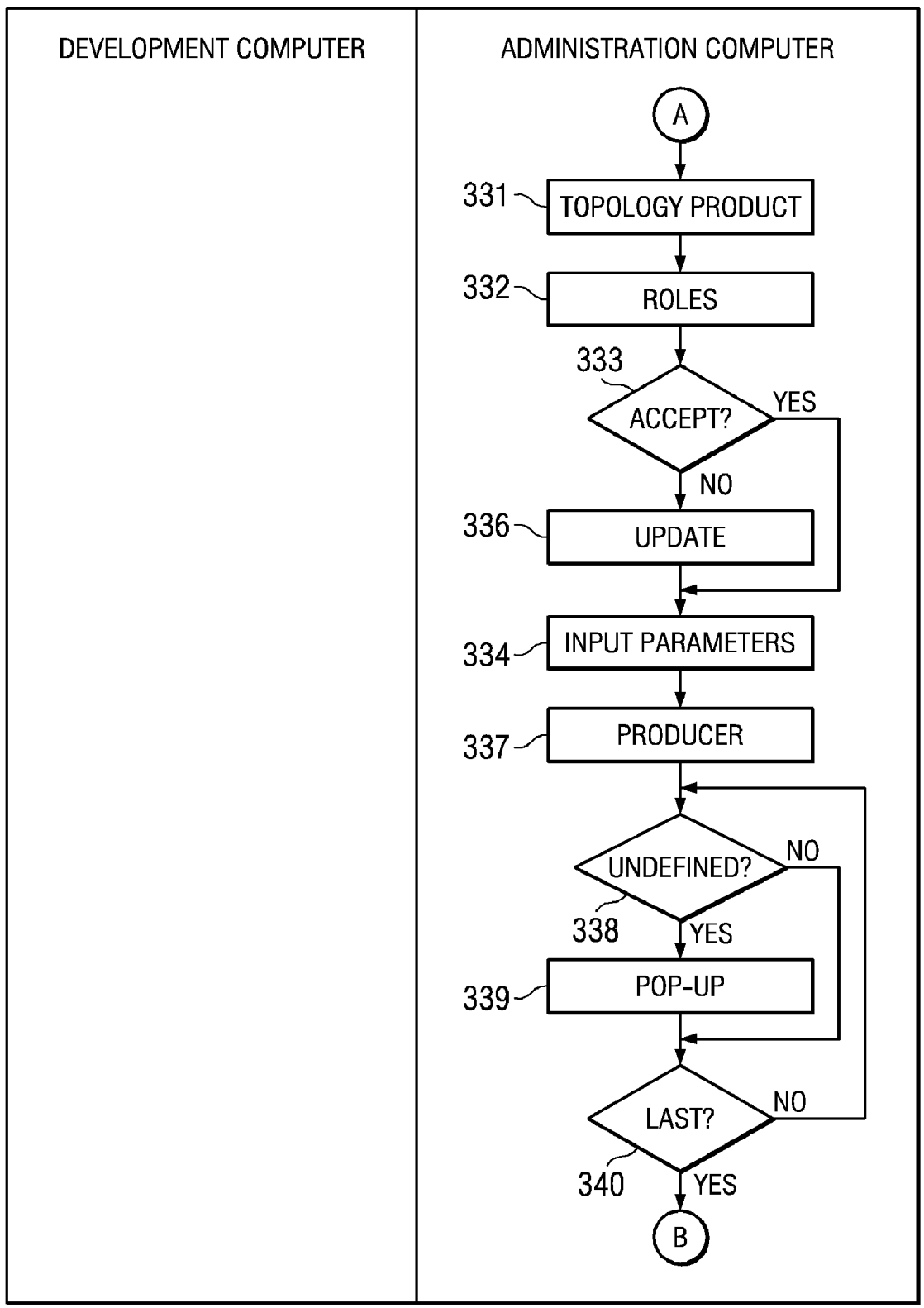
Figure 3C:
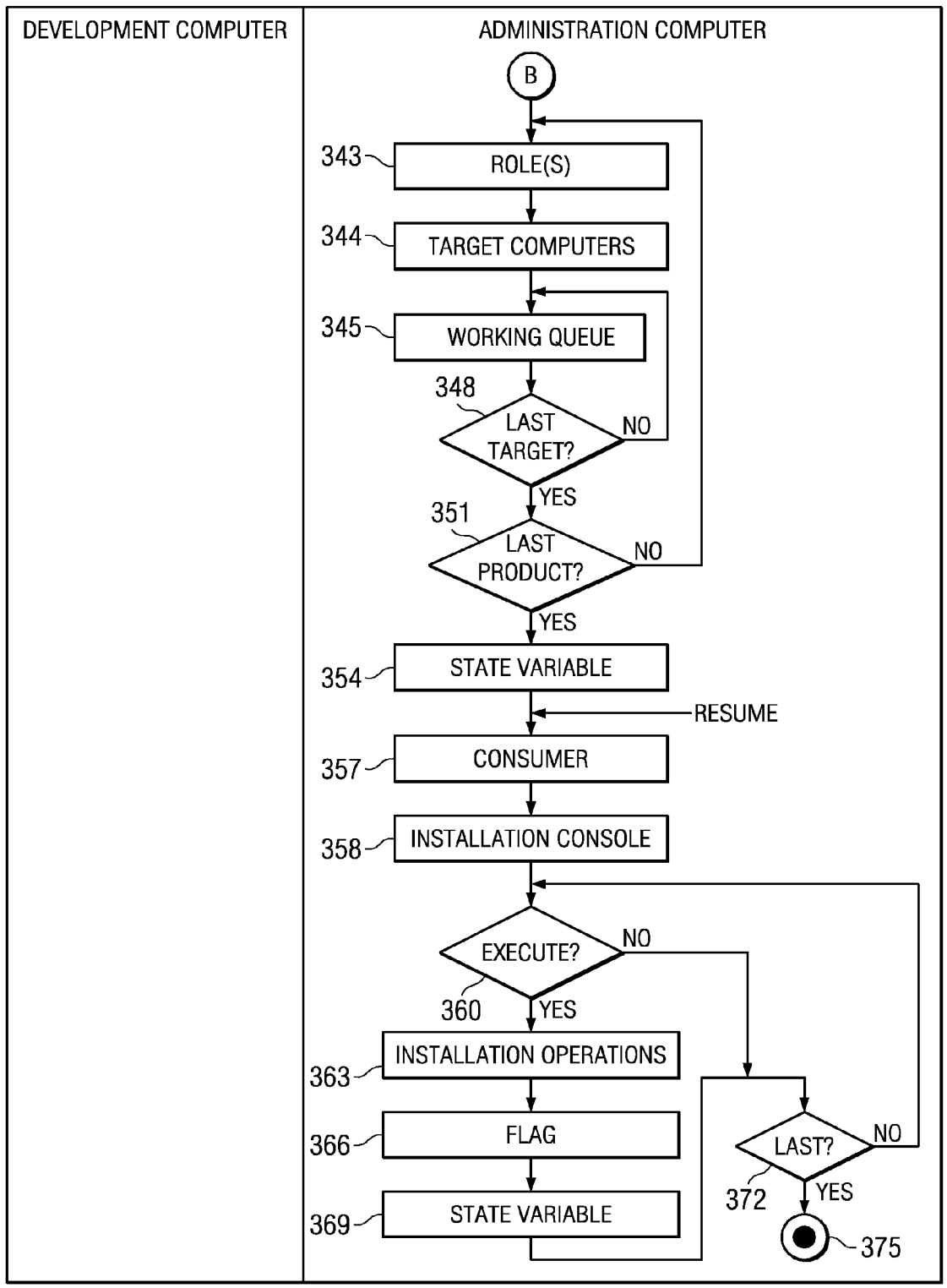

Considering now FIGS. 3a-3c, a method 300 performed during the installation process is illustrated. The method begins at the black start circle 303 in the swim-lane of the development computer. Continuing to block 306, the images of all the products of the software application to be deployed are provided. The method then passes to block 309, wherein the software application is defined by means of a corresponding descriptor.

Descending into block 310, the developer starts the authoring tool and inserts a Bean into the wizard tree for embedding the descriptor and the required product images. The method then passes to block 312, wherein the developer also inserts the discoverer into the wizard tree; typically, the discoverer is placed after some standard wizard Beans (for example, defining welcome, destination, and setup type panels). If the software application requires complex input parameters to be entered during the installation process (decision block 313), the developer at block 314 inserts one or more additional Beans into the wizard tree (for displaying corresponding custom panels); the method then passes to block 315. Conversely, the flow of activity descends into block 315 directly. Considering now block 315, the producer is likewise inserted into the wizard tree. The developer then inserts the consumer into the wizard tree at block 318, typically after some further standard wizard Beans (for example, defining license approval, password, and preview panels).

The activity flow continues to block 321 as soon as the definition of the wizard tree has been completed (while the product tree is left empty); the corresponding installation package is then built embedding all the elements declared in the wizard tree. Passing to block 324, the installation package is recorded on CD-ROMs and distributed to the administration computer.

Moving now to the swim-lane of the administration computer, the setup launcher associated with the installation package is run by the administrator at block 327. In response thereto, the discoverer is invoked at block 330 (after displaying the panels corresponding to the preceding Beans in the wizard tree). The discoverer at block 331 detects the topology of the system managed by the administration computer and the products that are installed on each target computer. Continuing to block 332, the detected information is used to identify the role(s) of each target computer. The process then passes to block 333, wherein a panel indicating the current configuration of the system is displayed. If the administrator accepts the proposed configuration, the process descends into block 334 (described in the following). Conversely, the administrator can update the configuration of the system at block 336 (for example, changing the roles of one or more target computers); the process then continues to block 334.

Considering now block 334, the Beans (if any) included in the wizard Beans for entering complex input parameters are invoked. As a consequence, the corresponding custom panels are displayed, prompting the administrator to enter the values of the input parameters needed for the installation process; those input parameters are stored in a global memory space. Descending into block 337, the producer is likewise invoked. For each input parameter defined in the descriptor (starting from the first one), the producer verifies at block 338 whether the input parameter has already been resolved (i.e., whether its value has been entered by the administrator at block 334). If not, a pop-up window is displayed at block 339, prompting the administrator to enter the value of the input parameter; the process then passes to block 340. Conversely, the activity flow descends into block 340 directly. A test is then made at block 340 to verify whether the last input parameter has been processed. If not, the method returns to block 338 to repeat the operations described above on a next input parameter; conversely, the flow of activity descends into block 343.

With reference now to block 343, for each software product of the application (starting from the first one), the producer extracts the associated role (or roles) from the descriptor. The target computers playing that role are identified at block 344 (according to the current configuration of the system). The producer at block 345 inserts an item into the working queue for the first target computer on which the software product must be installed, which item specifies the installation operations required to bring the target computer to the desired configuration defined in the descriptor (starting from its current configuration). A test is made at block 348 to determine whether the last target computer (wherein the software product must be installed) has been processed. If not, the method returns to block 345 to repeat the operations described above on a next target computer. Conversely, the activity flow enters decision block 351, wherein the producer verifies whether the last software product of the application has been processed. If not, the method returns to block 343 to repeat the operations described above for a next software product (as defined in the descriptor). On the contrary, the producer exits the above-described loop; descending into block 354, the state variable is set to a value denoting the creation of the working queue (and pointing to its first installation operation).

The process continues to block 357, wherein the consumer is invoked; the same block is also reached whenever the installation process is resumed (running the setup launcher again), having being interrupted after the creation of the working queue. Descending into block 358, the consumer loads the installation console. For each installation operation specified in the working queue (starting from the current one pointed by the state variable), the consumer verifies at block 360 whether that installation operation must be executed (i.e., whether it has not been successfully completed yet). If so, the blocks 363-369 are performed and the process then continues to block 372; conversely, the activity flow descends into block 372 directly.

Considering now block 363, the consumer drives the execution of the current installation operation (specified in the working queue). A flag denoting the result of the installation operation is set at block 366. The state variable is updated accordingly at block 369 (pointing to a next installation operation in the working queue). The decision block 372 is then reached either from the block 369 or from the block 360. If other installation operations in the working queue are to be processed, the method returns to block 360 in order to repeat the steps described above for a next installation operation. Conversely, the activity flow ends at the concentric white/black stop circles 375.

Similar considerations apply if an equivalent method is performed, or if the working queue is replaced with a different structure; moreover, other techniques can be used for storing the progress of the installation process and/or the result of the installation operations. In any case, the concepts of the present invention are also applicable when the installation console is invoked declaring a corresponding Bean into the wizard tree explicitly, or when the wizard tree includes a different number of custom Beans (down to a single one that invokes the discoverer, the producer and the consumer in succession).

Preferably, the descriptor is specified in the Extensible Markup Language (XML), which allows the creation of customized tags for any desired purpose. A section is defined for each software product of the application; the product section starts with a <Product> tag and ends with a </Product> tag. The product section includes two different (sub)sections enclosed between the tags <Element> and </Element>; a first element section defines a completely new (or fresh) installation of the product and a second element section defines an upgrade thereof.

For each element section, the type of installation ("Fresh" or "Upgrade") is defined between the tags <Type> and </Type>. The element section then includes a description of the product between the tags <Descr> and </Descr>. An identification tag of the product is enclosed between the tags <ProductID> and </ProductID>. The identification tag of different products implying the installation of that product (referred to as manifest tags) are enclosed between the tags <ManifestID> and </ManifestID>. For example, the element section of an old version of a product includes the more recent versions thereof as manifest tags; likewise, the element section of a component in a software suite includes that suite as manifest tag. Any product that is required as a prerequisite is specified between the tags <DependID> and </DependID>. Moreover, the name of the corresponding product image is indicated between the tags <Image> and </Image>. The element section further includes a portion that starts with a <Roles> tag and ends with a </Roles> tag. Each role requiring the installation of the product is indicated between the tags <TargetRole> and </TargetRole>.

The input parameters used for the installation of the product are defined between the tags <Parameter> and . Each input parameter consists of a key/value pair; the key of the parameter is defined between the tags <ParameterKey> and </ParameterKey>, whereas the name of a global variable wherein its value is stored is defined between the tags <ParameterVar> and </ParameterVar>. The name of a class that is responsible to install the product is defined in a portion that starts with a <Class> tag and ends with a </Class> tag. The name of the installation class is indicated between the tags <ClassID> and </ClassID>; any argument to be passed to the installation class is provided between the tags <ClassArg> and </ClassArg>. The consumer is also provided with a default installation class, which is used to install the product when no specific installation class is defined in the corresponding section.

For example, the following product section:

```
<Product>
    <Element>
        <Type>Fresh</Type>
        <Descr>MyProduct - Release 1 - Version 1</Descr>
        <ProductID>MyProduct1.1</ProductID>
        <ManifestID>MySuite</ManifestID>
        <Image>MyImageF</Image>
        <Roles>
            <TargetRole>MyRole</TargetRole>
        </Roles>
        <Parameter>
            <ParameterKey>MyKeyF1</ParameterKey>
            <ParameterVar>MyVarF1</ParameterVar>
            <ParameterKey>MyKeyF2</ParameterKey>
            <ParameterVar>MyVarF2</ParameterVar>
            <ParameterKey>MyKeyF3</ParameterKey>
            <ParameterVar>MyVarF3</ParameterVar>
        </Parameter>
        <Class>
            <ClassID>MyClassF</ClassID>
            <ClassArg>MyArgF1</ClassArg>
            <ClassArg>MyArgF2</ClassArg>
        </Class>
    </Element>
    <Element>
        <Type>Upgrade</Type>
        <Descr>MyProduct - Release 1 - Version 1</Descr>
        <ProductID>MyProduct1.1</ProductID>
        <ManifestID>MySuite</ManifestID>
        <DependID>MyProduct1.0</DependID>
        <Image>MyImageU</Image>
        <Roles>
            <TargetRole>MyRole</TargetRole>
        </Roles>
        <Parameter>
            <ParameterKey>MyKeyU</ParameterKey>
            <ParameterVar>MyVarU</ParameterVar>
        </Parameter>
        <Class>
            <ClassID>MyClassU</ClassID>
            <ClassArg>MyArgU</ClassArg>
        </Class>
    </Element>
</Product>
``` defines a fresh installation and an upgrade, respectively, of the release 1 and version 1 of a product "MyProduct". Considering in particular the element section relating to its fresh installation, the product "MyProduct" is identified by the tag "MyProduct1.1"; the manifest tag "MySuite" (corresponding to a software suite including the product "MyProduct1.1") implies the installation of the product "MyProduct1.1". The (fresh) installation of the product "MyProduct1.1" does not require any prerequisite. The corresponding product image is stored in the file "MyImageF". The product "MyProduct1.1" must be installed on the target computers playing the role "MyRole". The parameters consisting of the key/value pairs "MyKeyF1"/"MyVarF1", "MyKeyF2"/"MyVarF2" and "MyKeyF3"/"MyVarF3" are used for the installation of the product "MyProduct1.1" (with the values of the parameters "MyKeyF1", "MyKeyF2" and "MyKeyF3" that are stored in the global variables "MyVarF1", "MyVarF2" and "MyVarF3", respectively). The installation class "MyClassF" (receiving the arguments "MyArgF1" and "MyArgF2") is responsible to install the product "MyProduct1.1". Similar considerations apply to the element section relating to the upgrade of the product "MyProduct" (likewise identified by the tag "MyProduct1.1" and the manifest tag "MySuite"). Particularly, the upgrade of the product "MyProduct1.1" requires the installation of its previous version identified by the tag "MyProduct1.0". The corresponding product image is stored in the file "MyImageU". The product "MyProduct1.1" must be installed on the target computers playing the role "MyRole". The parameter consisting of the key/value pair "MyKeyU"/"MyVarU" is used for the upgrade of the product "MyProduct1.1. The installation class "MyClassU" (receiving the argument "MyArgU") is responsible to upgrade the product "MyProduct1.1".

Figure 4:
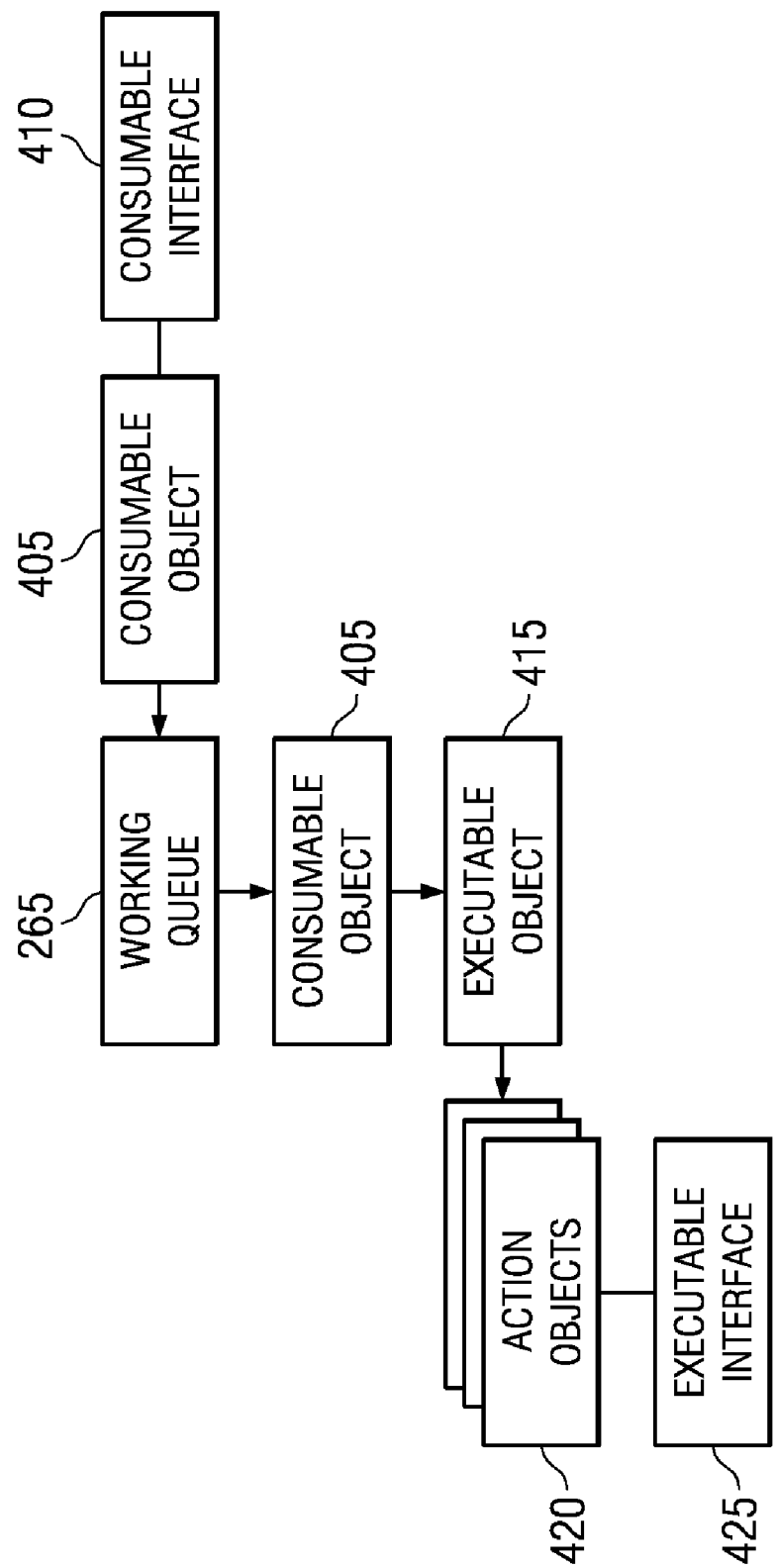
FIG. 4 illustrates an implementation of a working queue used during the installation process.

During the installation process, as shown in FIG. 4, each instance of the different installation classes defines a consumable object 405, which is inserted into the working queue 265. The consumable object 405 implements a consumable interface 410, which defines the behavior of the consumable object 405 when it is executed during the installation process; moreover, the consumable interface 410 exposes methods for managing the serialization/de-serialization of the consumable object 405 in the working queue 265. Whenever the consumer extracts a generic consumable object 405 from the working queue 265, the consumable object 405 is executed calling a method that creates a corresponding executable object 415. A method is then called on the executable object 415 for creating one or more action objects 420 for corresponding installation operations. Each action object 420 implements an executable interface 425, which defines the basic functions required for controlling the execution of the installation operation. In this way, any pre-existing classes providing installation operations can be reused in the proposed solution simply adding a portion of glue code that makes those classes compliant with the executable interface 425.

However, the concepts of the present invention are also applicable when the descriptor is replaced with one or more equivalent structures, when the descriptor is defined in another way (even using a different language), or when the installation operations are implemented with equivalent entities.

Figure 5:
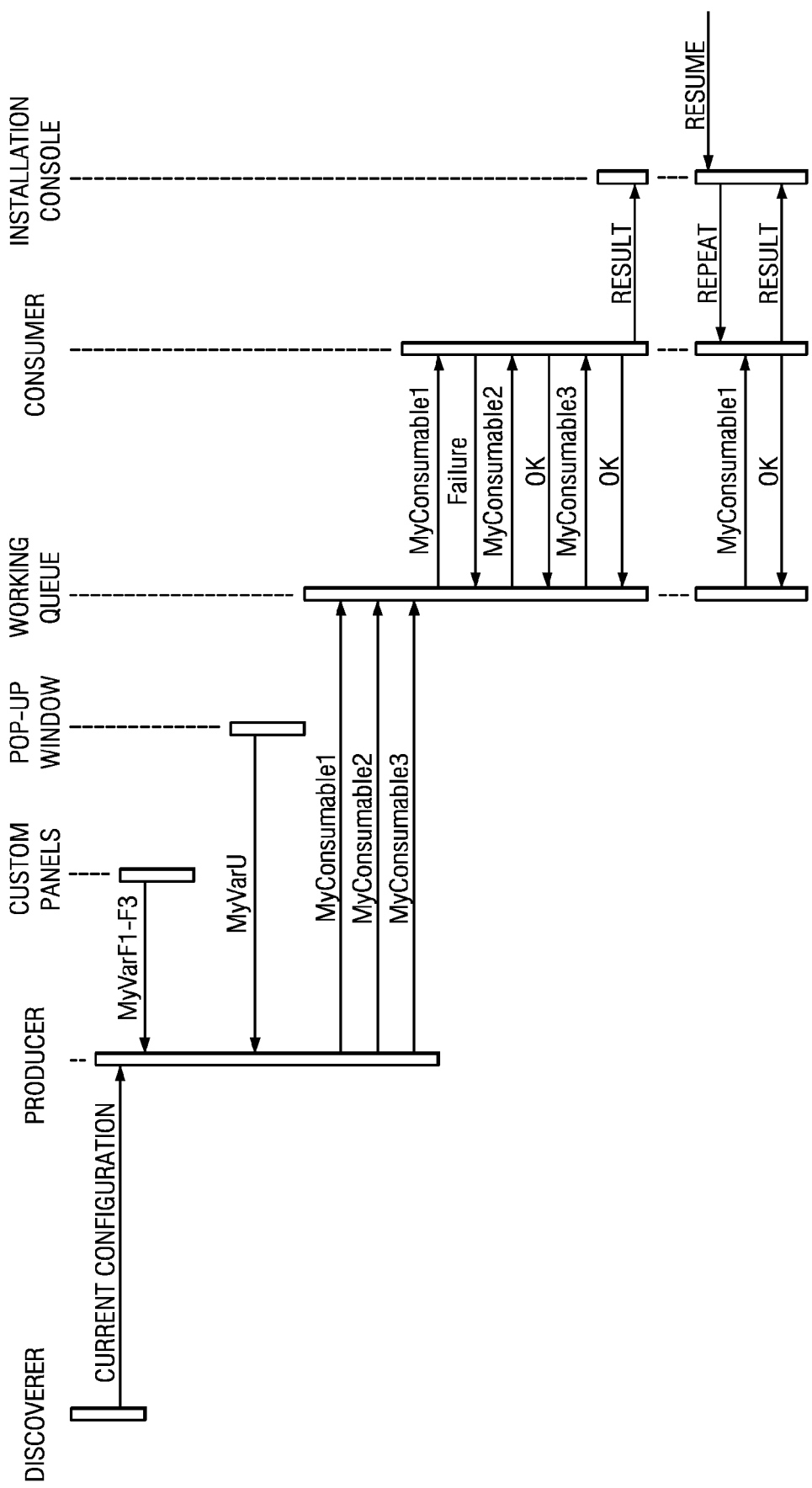
FIG. 5 is a sequence diagram exemplifying a specific installation process.

A scenario involved by the installation of a simple software application defined by the descriptor discussed above is illustrated in the sequence diagram of FIG. 5. For example, let us consider that the corresponding installation package is distributed to a system including three target computers ("MyTarget1", "MyTarget2" and "MyTarget3") playing the role "MyRole". The target computers "MyTarget1", "MyTarget2" have no product of the software application installed, whereas the target computer "MyTarget3" has the version 1 and release 0 of the product "MyProduct" (identified by the tag "MyProduct1.0") already installed.

When the installation package is run on the administration computer of the system, the discoverer detects the above-described current configuration of the system, which is then provided to the producer. A custom panel (defined in the wizard tree) is displayed so as to prompt the administrator to enter the values of the global variables "MyVarF1", "MyVarF2" and "MyVarF3" for the parameters "MyKeyF1", "MyKeyF2" and "MyKeyF3" (used during the fresh installation of the product "MyProduct1.1"). The producer then detects that the global variable "MyVarU" for the parameter "MyKeyU" (used during the upgrade of the product "MyProduct1.1") is still undefined. Therefore, a pop-up window is displayed to prompt the administrator to enter its value.

From the current configuration of the system (provided by the discoverer), the producer understands that the product "MyProduct1.1" must be installed on the target computers "MyTarget1", "MyTarget2" and must be upgraded on the target computer "MyTarget3" (being already available its prerequisite identified by the tag "MyProduct1.0"). Accordingly, the producer inserts a consumable object (denoted with "MyConsumable1") into the working queue, by instantiating the installation class "MyClassF" and passing the name of the target computer "MyTarget1" as an argument; likewise, the producer inserts a consumable object "MyConsumable2" into the working queue, by instantiating the same installation class "MyClassF" but passing the name of the target computer "MyTarget2" as an argument. The producer inserts a further consumable object "MyConsumable3" into the working queue, by instantiating the installation class "MyClassU" and passing the name of the target computer "MyTarget3" as an argument.

The consumer extracts the first consumable object "MyConsumable1" from the working queue and drives the execution of the corresponding installation operations. Assuming that the installation of the product "MyProduct1.1" fails (for example, because of a lack of memory space on the target computer "MyTarget1"), the flag denoting its result is set accordingly. The consumer then extracts the next consumable objects "MyConsumable2" and "MyConsumable3" from the working queue, and drives their execution in succession; assuming that both the fresh installation of the product "MyProduct1.1" on the target computer "MyTarget2" and the upgrade from the product "MyProduct1.0" to the product "MyProduct1.1" on the target computer "MyTarget3" succeed, the corresponding flags are set accordingly. The installation console notifies the result of the installation process to the administrator. The administrator can then take the actions required to solve the problem (for example, increasing the memory space available on the target computer "MyTarget1").

After solving the problem, the administrator resumes the installation process. As a consequence, the consumer is requested to repeat the execution of the consumable object "MyConsumable1". The installation of the product "MyProduct1.1" on the target computer "MyTarget1" now succeeds, configuring the system as specified in the descriptor. The installation process then ends with the installation console that notifies the administrator accordingly.

Similar considerations apply to different scenarios, which relate to alternative software applications or involve other products or systems.

More generally, an aspect of the present invention proposes a method of installing a software application on a data processing system according to installation elements that have been previously declared. In the method of the invention, a discoverer element detects a current configuration of the system. A producer element creates a working structure dynamically; the working structure includes an indication of installation operations for reaching a target configuring (defined in a specification element) from the current configuration. A consumer element then executes the installation operations indicated in the working structure.

The method of the invention provides a dynamic behavior in installation packages built using a tool based on a declarative model; particularly, the proposed solution makes it possible to determine the installation operations dynamically at runtime (during the installation process).

In addition, the definition of the installation package is strongly simplified; as a consequence, the installation package becomes very easy to maintain.

The method of the invention is suitable to be used in dynamic environments, wherein no assumptions can be made (when the installation package is built) about the structure of the data processing system wherein the software application will be installed. This advantage is clearly perceived in data processing systems with a distributed architecture, because their actual topology is known only at runtime.

The preferred embodiment of the invention described above offers further advantages.

Particularly, the descriptor defines the desired configuration for each role that can be played by the target computers.

In this way, the definition of any complex solution to be deployed is strongly simplified (being completely independent of the actual structure of the system wherein it will be installed).

A way to further improve the solution is to define different installation operations (in the descriptor) for a fresh installation and an upgrade, respectively, of each software product.

Therefore, the two situations can be addressed in a very simple manner.

Advantageously, the execution of the installation operations is controlled by a corresponding console.

The proposed feature provides a high degree of interaction with the installation process (which interaction is very useful for complex topology generations). Particularly, the installation console allows repeating each failed installation operation.

As a consequence, the installation process can be resumed after solving any problem that has been encountered (without repeating the installation operations already completed).

As a further enhancement, any input parameter required during the installation process can be entered by means of either a static panel (declared when the installation package is built) or a dynamic panel (generated by the consumer when the input parameter is still undefined).

The devised technique is very flexible. Particularly, complex input parameters can be managed by custom static panels; conversely, single input parameters can be entered by dynamic panels generated automatically during the installation process.

Preferably, the package is built using an authoring tool based on the product tree and the wizard tree (with the discoverer, the producer and the consumer that are inserted into the wizard tree, while the product tree is left empty).

Therefore, all the installation operations are performed outside the product tree, thereby allowing a high degree of control over their execution.

However, the method of the present invention is also suitable to be implemented defining the desired configuration of the system with a different reference model; for example, the target computers wherein the software products must be installed are selected by the administrator directly (without the definition of any role). In addition, the descriptor can include the specification of installation operations for other situations (such as for configuring each software product after its installation). Alternatively, the installation console provides different functions or the consumer consists of a simple module only executing the installation operations specified in the working queue (without supporting any interaction capability). In addition, the input parameters (if any) required during the installation process can be entered in another way (for example, by means of static panels only). In any case, the proposed method leads itself to be used even with different authoring tools (based on equivalent structures for declaring the elements to be used during the installation process).

Advantageously, the method according to the present invention results in the building of an installation package, which is provided as a corresponding product stored on a suitable medium.

Alternatively, the installation package is sent to the administration computer through a network (typically the INTERNET), is broadcasted, or more generally is provided in any other form directly loadable into a working memory of the systems wherein the software application must be installed.

Preferably, the software application is installed on a data processing system with a distributed architecture (having a computer configured to receive and run the installation package).

However, the use of the proposed installation package on different systems (even consisting of a stand-alone computer) is not excluded.

Naturally, in order to satisfy local and specific requirements, a person skilled in the art may apply to the solution described above many modifications and alterations all of which, however, are included within the scope of protection of the invention as defined by the following claims.

The invention claimed is:

1. A computer program product for installing a software application on a data processing system according to installation elements being previously declared comprising a computer recordable medium having a computer readable program recorded thereon, wherein the computer readable program, when executed on a computing device, causes the computing device to:

define, using a specification element, a target configuration for a role of at least one target computer that is played by the at least one target computer of the data processing system, wherein the specification element is embedded along with at least one product image for the software application in a Bean into a wizard tree that is invoked during an installation process, and wherein the role is a logic role that is inferred from software products installed on the at least one target computer during the installation process;

display, using at least one first standard Bean, at least one of a welcome panel, a destination panel, and a setup panel on the at least one target computer, wherein the at least one first standard Bean is inserted into the wizard tree that is invoked during the installation process;

detect, using a discoverer element, a current configuration of the at least one target computer during the installation process including the role played by the at least one target computer, wherein the discover element is embedded into the wizard tree that is invoked during the installation process;

display, using at least one complex input parameter Bean, a custom panel on the at least one target computer that allows at least one complex parameter to be entered during the installation process, wherein the at least one complex input parameter Bean is inserted into the wizard tree that is invoked during the installation process;

create, using a producer element, a working structure dynamically, the working structure including an indication of installation operations for reaching the target configuration defined in the specification element from the current configuration, wherein the producer element is embedded into the wizard tree that is invoked during the installation process;

display, using at least one second standard Bean, at least one of a license approval panel, a password panel, and a preview panel on the at least one target computer, wherein the at least one second standard Bean is inserted into the wizard tree that is invoked during the installation process; and execute, using a consumer element, the installation operations indicated in the working structure, wherein the consumer element is embedded into the wizard tree that is invoked during the installation process.

2. The computer program product of claim 1, wherein the data processing system includes a plurality of processing entities each one associated with at least one of a plurality of predefined roles and wherein a target configuration of the data processing system includes a target configuration for each role, and wherein the computer readable program to detect the current configuration of the data processing system further causes the computing device to:

detect the at least one role of each entity.

3. The computer program product of claim 2, wherein the target configuration for each role includes a definition of at least one software product to be installed, the definition of the at least one software product including an indication of first installation operations for installing the at least one software product when a previous version of the at least one software product is already installed and an indication of second installation operations for installing the at least one software product otherwise, and wherein the computer readable program to detect the current configuration of the data processing system further causes the computing device to:

detect the software products installed on each entity.

4. The computer program product of claim 1, wherein the computer readable program further causes the computing device to:

interactively control, using a console element, execution of the installation operations indicated in the working structure.

5. The computer program product of claim 4, wherein the computer readable program to control execution of the installation operations further causes the computing device to:

store an indication of each installation operation failed during the installation process, and repeat the execution of each failed installation operation.

6. An apparatus for installing a software application on a data processing system according to installation elements being previously declared, comprising:

a processor; and a memory coupled to the processor, wherein the memory comprises instructions which, when executed by the processor, cause the processor to:

define, using a specification element, a target configuration for a role of at least one target computer that is played by the at least one target computer of the data processing system, wherein the specification element is embedded along with at least one product image for the software application in a Bean into a wizard tree that is invoked during an installation process, and wherein the role is a logic role that is inferred from software products installed on the at least one target computer during the installation process;

display, using at least one first standard Bean, at least one of a welcome panel, a destination panel, and a setup panel on the at least one target computer, wherein the at least one first standard Bean is inserted into the wizard tree that is invoked during the installation process;

detect, using a discoverer element, a current configuration of the at least one target computer during the installation process including the role played by the at least one target computer, wherein the discover element is embedded into the wizard tree that is invoked during the installation process;

display, using at least one complex input parameter Bean, a custom panel on the at least one target computer that allows at least one complex parameter to be entered during the installation process, wherein the at least one complex input parameter Bean is inserted into the wizard tree that is invoked during the installation process;

create, using a producer element, a working structure dynamically, the working structure including an indication of installation operations for reaching the target configuration defined in the specification element from the current configuration, wherein the producer element is embedded into the wizard tree that is invoked during the installation process;

display, using at least one second standard Bean, at least one of a license approval panel, a password panel, and a preview panel on the at least one target computer, wherein the at least one second standard Bean is inserted into the wizard tree that is invoked during the installation process; and execute, using a consumer element, the installation operations indicated in the working structure, wherein the consumer element is embedded into the wizard tree that is invoked during the installation process.

7. The apparatus of claim 6, wherein the data processing system includes a plurality of processing entities each one associated with at least one of a plurality of predefined roles and wherein a target configuration of the data processing system includes a target configuration for each role, and wherein the instructions to detect the current configuration of the data processing system further causes the processor to:

detect the at least one role of each entity.

8. The apparatus of claim 7, wherein the target configuration for each role includes a definition of at least one software product to be installed, the definition of the at least one software product including an indication of first installation operations for installing the at least one software product when a previous version of the at least one software product is already installed and an indication of second installation operations for installing the at least one software product otherwise, and wherein the instructions to detect the current configuration of the data processing system further cause the processor to:

detect the software products installed on each entity.

9. The apparatus of claim 6, wherein the instructions further cause the processor to:

interactively control, using a console element, execution of the installation operations indicated in the working structure.

10. The apparatus of claim 9, wherein the instructions to control execution of the installation operations further cause the processor to:

store an indication of each installation operation failed during the installation process, and repeat the execution of each failed installation operation.

11. A computer program product for building an installation package for installing a software application on a data processing system, the package being built using a tool based on a declarative model requiring a declaration of installation elements to be embedded in the installation package for use during an installation process comprising a computer recordable medium having a computer readable program recorded thereon, wherein the computer readable program, when executed on a computing device, causes the computing device to:

initialize an authoring tool;

declare a specification element, wherein the specification element defines a target configuration for a role of at least one target computer that is played by the at least one target computer of the data processing system, wherein the specification element is embedded along with at least one product image for the software application in a Bean into a wizard tree, and wherein the role is a logic role that is inferred from software products installed on the at least one target computer during the installation process;

insert at least one first standard Bean into the wizard tree, wherein the at least one first standard Bean is at least one of a welcome Bean, a destination Bean, and a setup Bean that generates a display on the at least one target computer;

declare a discoverer element into the wizard tree for detecting a current configuration of the at least one target computer during the installation process including the role played by the at least one target computer;

insert at least one complex input parameter Bean into the wizard tree for displaying a custom panel on the at least one target computer that allows at least one complex parameter to be entered during the installation process;

declare a producer element into the wizard tree for creating a working structure dynamically during the installation process, the working structure including an indication of installation operations for reaching the target configuration from the current configuration;

insert at least one second standard Bean into the wizard tree, wherein the at least one second standard Bean is at least one of a license approval Bean, a password Bean, and a preview Bean that generates a display on the at least one target computer;

declare a consumer element into the wizard tree for executing the installation operations indicated in the working structure during the installation process; and embed the declared elements and Beans into the installation package.

12. The computer program product of claim 11, wherein the data processing system includes a plurality of processing entities each one associated with at least one of a plurality of predefined roles, a target configuration of the data processing system including a target configuration for each role and the current configuration including the at least one role of each entity.

13. The computer program product of claim 12, wherein the target configuration for each role includes a definition of at least one software product to be installed, the definition of the at least one software product including an indication of first installation operations for installing the at least one software product when a previous version of the at least one software product is already installed and an indication of second installation operations for installing the at least one software product otherwise, and wherein the current configuration of the data processing system includes an indication of the software products installed on each entity.

14. The computer program product of claim 12, wherein the computer readable program further causes the computing device to:

declare a console element for interactively controlling execution of the installation operations indicated in the working structure during the installation process.

15. The computer program product of claim 14, wherein the console element is suitable to store an indication of each installation operation failed during the installation process and to repeat the execution of each failed installation operation.

16. An apparatus for building an installation package for installing a software application on a data processing system, the package being built using a tool based on a declarative model requiring a declaration of installation elements to be embedded in the installation package for use during an installation process, comprising:
   a processor; and
   a memory coupled to the processor, wherein the memory comprises instructions which, when executed by the processor, cause the processor to:
   initialize an authoring tool;
   declare a specification element, wherein the specification element defines a target configuration for a role of at least one target computer that is played by the at least one target computer of the data processing system, wherein the specification element is embedded along with at least one product image for the software application in a Bean into a wizard tree, and wherein the role is a logic role that is inferred from software products installed on the at least one target computer during the installation process;
   insert at least one first standard Bean into the wizard tree, wherein the at least one first standard Bean is at least one of a welcome Bean, a destination Bean, and a setup Bean that generates a display on the at least one target computer;
   declare a discoverer element into the wizard tree for detecting a current configuration of the at least one target computer during the installation process including the role played by the at least one target computer;
   insert at least one complex input parameter Bean into the wizard tree for displaying a custom panel on the at least one target computer that allows at least one complex parameter to be entered during the installation process;
   declare a producer element into the wizard tree for creating a working structure dynamically during the installation process, the working structure including an indication of installation operations for reaching the target configuration from the current configuration;
   insert at least one second standard Bean into the wizard tree, wherein the at least one second standard Bean is at least one of a license approval Bean, a password Bean, and a preview Bean that generates a display on the at least one target computer;
   declare a consumer element into the wizard tree for executing the installation operations indicated in the working structure during the installation process; and
   embed the declared elements and Beans into the installation package.

17. The apparatus of claim 16, wherein the data processing system includes a plurality of processing entities each one associated with at least one of a plurality of predefined roles, a target configuration of the data processing system including a target configuration for each role and the current configuration including the at least one role of each entity.

18. The apparatus of claim 17, wherein the target configuration for each role includes a definition of at least one software product to be installed, the definition of the at least one software product including an indication of first installation operations for installing the at least one software product when a previous version of the at least one software product is already installed and an indication of second installation operations for installing the at least one software product otherwise, and wherein the current configuration of the data processing system includes an indication of the software products installed on each entity.

19. The apparatus of claim 17, wherein the instructions further cause the processor to:
   declare a console element for interactively controlling execution of the installation operations indicated in the working structure during the installation process.

20. The apparatus of claim 19, wherein the console element is suitable to store an indication of each installation operation failed during the installation process and to repeat the execution of each failed installation operation.

* * * * *